US006625737B1

(12) United States Patent
Kissell

(10) Patent No.: US 6,625,737 B1
(45) Date of Patent: Sep. 23, 2003

(54) SYSTEM FOR PREDICTION AND CONTROL OF POWER CONSUMPTION IN DIGITAL SYSTEM

(75) Inventor: Kevin D. Kissell, Le Bar sur Loup (FR)

(73) Assignee: MIPS Technologies Inc., Mountainview, CA (US)

( * ) Notice: Subject to any disclaimer, the term of this patent is extended or adjusted under 35 U.S.C. 154(b) by 548 days.

(21) Appl. No.: 09/665,099

(22) Filed: Sep. 20, 2000

(51) Int. Cl.$^7$ ................................................. G06F 1/26
(52) U.S. Cl. ....................................................... 713/300
(58) Field of Search ................................. 713/200, 300, 713/310, 340; 712/200, 216; 717/124–135

Primary Examiner—Thomas M. Heckler

(74) Attorney, Agent, or Firm—James W. Huffman

(57) ABSTRACT

An apparatus and method are provided that disassociates the power consumed by a processing device from the instructions that are executing, on a clock-by-clock basis. The apparatus includes a power predictor that predicts the power that will be consumed by the processing device during execution of particular instructions, and a power counterweight, that adds a counterweight current to the total power consumption of the processing device. By predicting the power that will be consumed during execution, and by adding a counterweight current during instruction execution, the total power consumed is made invariant. In another aspect, a random counterweight generator produces a random counterweight current which is added to the power consumed during instruction execution to disassociate the power consumed from the instructions being executed.

40 Claims, 7 Drawing Sheets

| R | A | M | W | Total |
|---|---|---|---|---|
| $I_4=5$ | $I_3=20$ | $I_2=30$ | $I_1=10$ | 65 |
| $I_5=10$ | $I_4=20$ | $I_3=20$ | $I_2=20$ | 70 |
| $I_6=5$ | $I_5=15$ | $I_4=15$ | $I_3=10$ | 45 |
| $I_7=10$ | $I_6=20$ | $I_5=20$ | $I_4=10$ | 60 |
| $I_8=15$ | $I_7=20$ | $I_6=30$ | $I_5=15$ | 80 | per stage counterweight (i)

SYSTEM FOR PREDICTION AND CONTROL OF POWER CONSUMPTION IN DIGITAL SYSTEM

BACKGROUND OF THE INVENTION

1. Field of the Invention

This invention relates in general to the field of instruction processing in computer systems, and more particularly to an apparatus and method in a CPU for predicting power consumption for executing instructions and counterbalancing or randomizing total power consumption for security purposes.

2. Description of the Related Art

Early computers processed instructions, one at a time, with the instructions appearing on a data/address bus. The data/address bus was electrically visible to a test engineer such that probes could be directly attached to the bus, and the bus could be monitored to determine what instructions were executing. In fact, in embedded system design, it was common for a developer to utilize a test device, such as a state analyzer, to help test and debug his program.

For example, a developer would connect a state analyzer to the data/address bus of his computer, load his program into the memory of the computer, and then reset the computer so that it would begin processing his instructions. The state analyzer would record the instructions being executed on a clock-by-clock basis. The developer could examine the instructions recorded by the state analyzer, and could determine whether his program was executing as planned.

In a similar manner, someone wanting to discover what program was operating on a computer could connect a state analyzer to the data/address bus, and could capture the program as it executed (i.e. reverse engineer the code).

With the advent of the microprocessor, testing of program code, and reverse engineering of program code, became more difficult. Early microprocessors utilized address and data buses to obtain their instructions and data from external memory such as ROM's and RAM's. Thus, a state analyzer could be coupled to the address and data buses of a microprocessor to capture the values appearing on the buses on a clock-by-clock basis. Software programs, called disassemblers, were then used to interpret the values appearing on the address and data buses, and convert them into the actual instructions that were being executed by the microprocessor. Thus, state analyzers, along with disassemblers, were used both by software developers for debugging, and by those interested in discovering what someone else had programmed.

As the complexity of microprocessors increased, so did the difficulty of testing (or reverse engineering) the instructions they were executing. For example, modern processors, although they have external data and address buses, cannot successfully be probed to determine what instructions are executing. This is because the values appearing on the address and data buses seldom relate to what the processor is doing at any one time.

More specifically, within a modern microprocessor are large areas of memory (or cache) for both data and instructions. When a processor needs data or instructions that are not already resident within the processor, the processor will request the data/instructions from external memory. It is common, however, for blocks of data/instructions, in addition to those particularly requested, to be transferred back to the processor. So, examination of the external data/address buses during the transfer does not provide any direct correlation to the instructions that are executing. In addition, as is most often the case, the data and instructions that are executing are already resident within internal cache. So, as they execute, there is no activity on the external address/data buses that provide any indication as to what is being executed.

Furthermore, most modern processors are capable of executing multiple instructions at the same time, using a technology referred to as "pipelining". Although pipelining is beyond the scope of the present discussion, suffice it to say that pipelining in a microprocessor is similar to an assembly line, where an instruction proceeds thru several stages within a processor, each stage performing a certain operation. The instruction is preceded and followed by other instructions, in preceding and following stages in the pipeline. Thus, at any one time, a pipelined microprocessor is executing as many different instructions as there are stages in the pipeline (e.g., a 5 stage pipeline may be executing 5 different instructions).

So, since there is no longer a direct correlation between what appears on the data/address buses of a processor, and the instructions it is executing, and because multiple instructions are typically executing simultaneously, other methodologies have been developed for both software test, and reverse engineering. For software test, a common approach is the use of a simulator. The simulator utilizes a software model of the internal architecture of a processor (such as a VHDL model) to execute a particular program. A trace output from the simulator provides an indication to a developer of how his program should function within a fabricated processor. The simulator is a great tool for the developer, because s/he has access to the internal model of the processor.

The reverse engineer, however, has no access to the internal model of a processor that s/he is trying to decode. Such an internal model is highly proprietary, and closely guarded by the developer. But the reverse engineer has not been thwarted. Rather, a sophisticated science, referred to as "differential power analysis" (DPA), has been developed to speculate or determine the instruction flow within a processor.

In general, certain estimates can be made about the size and thus the power requirements of particular functional blocks (cache, ALU, Register, etc.) of a modern processor. Using these estimates, the total power consumed by a microprocessor can be monitored on a clock-by-clock basis, while the microprocessor is executing instructions. Analysis of the power consumed by the microprocessor, in conjunction with speculated power requirements associated with each of the instructions in the processor's instruction set, can often allow a reverse engineer to accurately speculate or determine the instructions being executed by a processor.

In many cases, such reverse engineering can have devastating consequences. For example, one modern application of a microprocessor is within a Smart card. The Smart card is much like a credit card. However, it contains a microprocessor that stores confidential information such as a person's bank account number, balance, medical history, social security number, etc. Thus, the developer of a Smart card is very interested in preventing the information within the processor from being discovered. Differential power analysis applied to reverse engineering the processor can allow such confidential to be discovered, and utilized, to the detriment of the cardholder.

In view of the above, what is needed is an apparatus that may be used within a microprocessor, to prevent the reverse engineering of the program that is executing on the processor.

More specifically, what is needed is a power management apparatus that can disassociate the power that is consumed by a microprocessor, during instruction execution, from the actual power requirements of those instructions. Such an apparatus, in disassociating the power consumed by the microprocessor, from the instructions it is executing, would thwart a reverse engineer's attempt to discover confidential information using differential power analysis.

SUMMARY

For the foregoing reasons, there is a need for an apparatus and method that disassociates the power consumption of a microprocessor from the instructions that it is executing.

To address the above-detailed deficiencies, it is an object of the present invention to provide an apparatus within a processing device for disassociating the power consumed by the processing device with the instructions it is executing. The apparatus includes a power predictor, and a power counterweight. The power predictor provides a power consumption value for an executing instruction. The power counterweight is coupled to the power predictor to receive the power consumption value there from, and to generate a counterweight current. The counterweight current causes the total power consumption of the processing device to be disassociated with the executing instruction.

In another aspect, the present invention provides a power security system for a microprocessor to insure that the power consumption of the microprocessor is not indicative of the instructions that it is executing. The system includes a power predictor and a power counterweight circuit. The power predictor estimates power that will be consumed by the microprocessor when executing particular instructions. The power counterweight circuit is coupled to the power predictor to utilize the estimated power, and to apply counterweight power within the microprocessor during execution of the instructions. The counterweight power applied by the power counterweight circuit varies according to the estimated power. In one embodiment, the power predictor includes a power profile table that has entries that correspond to different instructions. Each of the entries includes a number of power estimates that correspond to power consumed by an instruction within different pipeline stages of the microprocessor.

In yet another aspect, the present invention provides an apparatus within a processing device that randomizes the total power consumed within the processing device. The apparatus includes a random value generator and a counterweight generator. The random value generator generates a random value as instructions are executed by the processing device. The counterweight generator is coupled to the random value generator, and generates a random power counterweight corresponding to the generated random value. The random power counterweight disassociates the instructions that are executed from power consumed by the processing device during their execution.

A further aspect of the present invention provides a computer program product for use with a computing device. The computer program product includes a computer usable medium, having computer readable program code embodied in the medium, to cause a CPU to be described. The computer readable program code includes first program code and second program code. The first program code provides a power predictor that predicts the power that will be consumed as an instruction executes on the CPU. The second program code provides a power counterweight to generate a counterweight current as the instruction executes on the CPU. The counterweight current disassociates the total power consumed by the CPU from the executing instruction.

In yet another aspect, the present invention provides a method for disassociating, on a clock by clock basis, the power that is consumed by a pipelined microprocessor, from the instructions that it is executing. The method includes estimating the power that will be consumed by each instruction in the pipeline for each clock cycle. In addition, the method includes adding a counterweight current on each clock cycle such that the total power consumed by the microprocessor is invariant.

BRIEF DESCRIPTION OF THE DRAWINGS

These and other objects, features, and advantages of the present invention will become better understood with regard to the following description, and accompanying drawings where.

DETAILED DESCRIPTION

Figure 1:
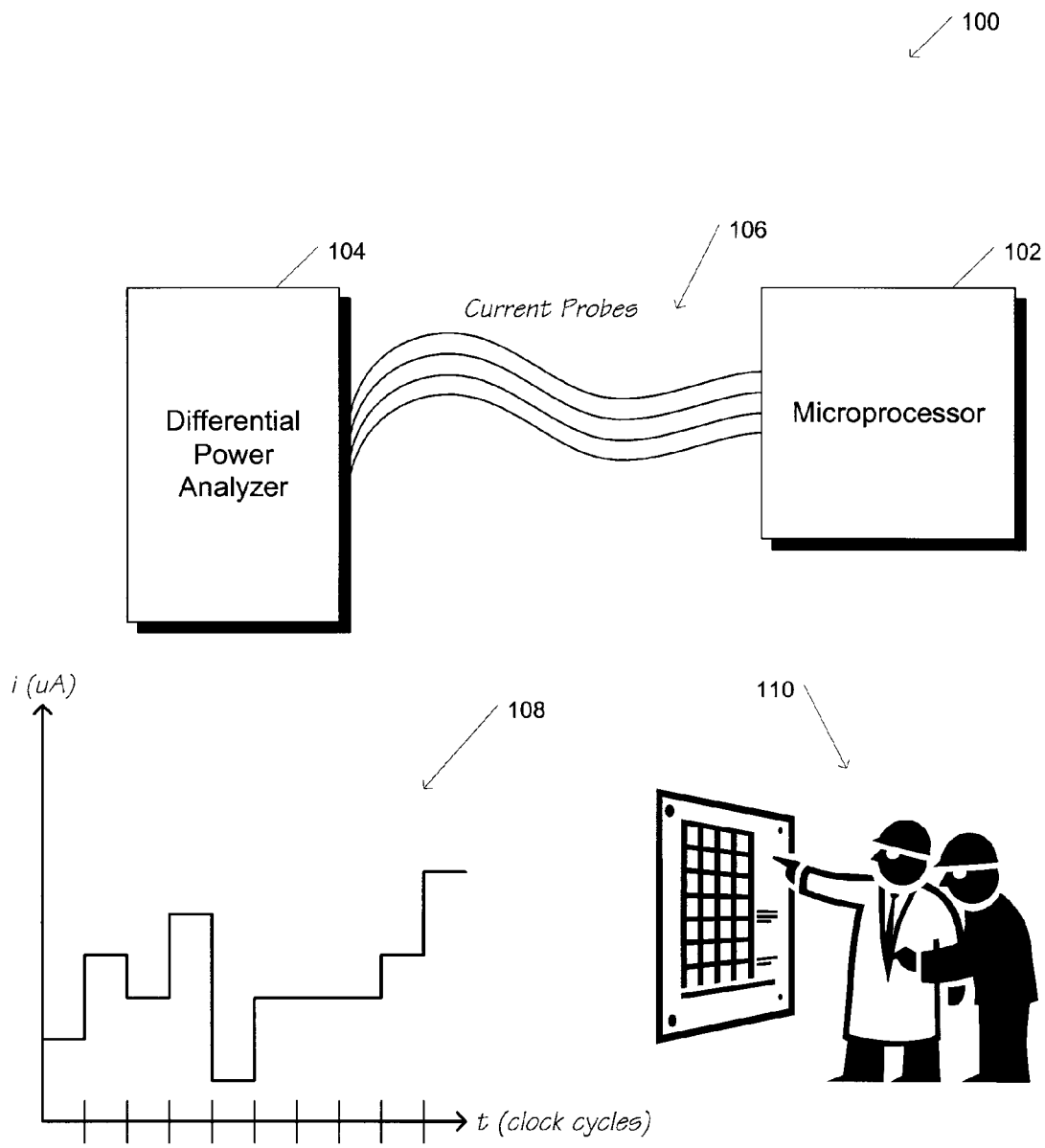
FIG. 1 is a prior art diagram illustrating the use of differential power analysis to determine instruction flow in a microprocessor

Referring to FIG. 1, a block diagram 100 is shown of a prior art method of determining what instructions are executing on a microprocessor using a technology referred to as differential power analysis. More specifically, a microprocessor 102 is shown attached to a differential power analyzer 104 via current probes 106. In most instances, the differential power analyzer 104 is a current monitor that is capable of measuring current drain on selected pins of the microprocessor 102, on a clock-by-clock basis. Since the voltage is constant, power consumed by the microprocessor 102 may be determined by measuring the current drawn on each of its power supply pins. A graph 108 is shown illustrating the cumulative current (measured along the y-axis) drawn by the microprocessor 102 during consecutive clock cycles (measured along the x-axis). Also shown are two scientists 110 examining the chart 108 to try to understand what the microprocessor is doing during each clock cycle.

For example, it is possible to characterize functional blocks within a microprocessor 102, such as floating point units, integer Arithmetic Logic Units (ALU's), cache memory systems, etc., in terms of how much power is required for the units to perform a task during a clock cycle. Once such a characterization is done (or estimated), measurement of current consumed by the microprocessor 102 can allow fairly accurate speculation, if not determination, of exactly which instructions are executing on the microprocessor, even though the scientists 110 do not have access to programmed instructions, as written, or to the internal buses of the microprocessor 110. And, by determining what the instructions are that are executing on the microprocessor 102, security features of the microprocessor 102 may be broken.

Figure 2:
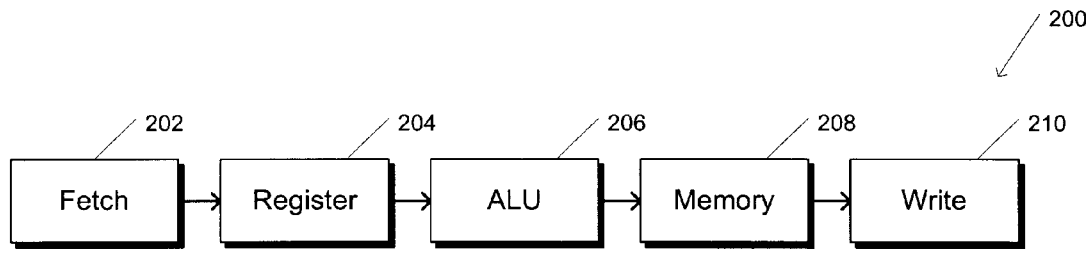
FIG. 2 is a prior art block diagram illustrating power variation per clock cycle of a sequence of executing instructions in a pipeline microprocessor.
Figure 2:
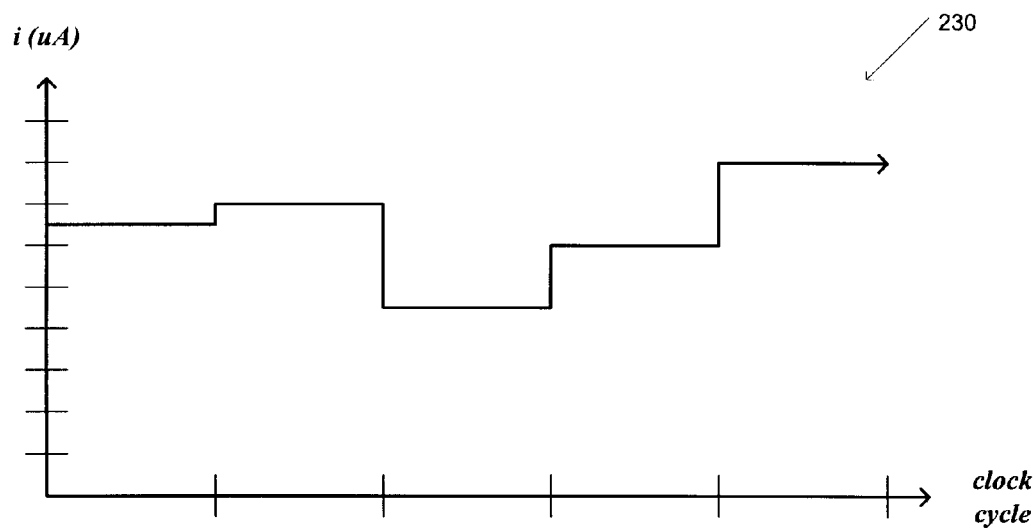

Referring now to FIG. 2, a prior art block diagram 200 is shown to particularly illustrate the effect of different instructions, or instruction types, on the power consumption of a pipelined microprocessor. More specifically, a 5-stage microprocessor 200 is shown. The stages include: Fetch 202, Register 204, ALU 206, Memory 208 and Write 210. The Fetch stage 202 utilizes a program counter (not shown) to fetch instructions to be executed by the processor 200. Once fetched, the instructions are provided to the Register stage 204. The Register stage 204 decodes the instructions, and if necessary, retrieves the contents of specified operands and provides them to the ALU stage 206. The ALU stage 206 either performs arithmetic on the operands, or calculates addresses, for load/store instructions. Instruction flow then proceeds to the Memory stage 208. The memory stage 208 is typically associated with cache access for load/store operations. Instruction flow then proceeds to the Write stage 210 where the result of ALU operations, or data retrieved from the cache, are written back to the register file or memory (not shown).

For exemplary purposes, a table 220 is provided to illustrate the progression of eight instructions ($I_1$–$I_8$) through the pipeline stages 204–210 of the processor 200. One skilled in the art will appreciate that the current values associated with each of the instructions is illustrative only, and no meaning should be attached to the specific values shown.

During a first clock cycle, instruction $I_1$ is in the W stage 210, instruction $I_2$ is in the M stage 208, instruction $I_3$ is in the A stage 206, and instruction $I_4$ is in the R stage 204. As shown, each of the instructions $I_1$ thru $I_4$ consumes different amounts of power (5–30) depending on what function they are performing, and depending on which pipeline stage they are in. In this illustration, their combined current consumption is 65.

During a second clock cycle, instruction $I_1$ falls out of the pipeline, instructions $I_2$–$I_4$ proceed to the next pipeline stage, and instruction $I_5$ enters the R stage 204. At this point, two things should be understood. First, instructions typically proceed sequentially from the R stage 204, thru to the W stage 210. Second, the amount of current consumed by a particular instruction is not constant through each of the stages. Rather, the current consumed by a particular instruction will often vary from stage to stage, with the amount in each stage determined by the type of instruction executing. In the second clock cycle, the combined current consumption is shown to be 70.

During a third clock cycle, instruction $I_2$ falls out of the pipeline, instructions $I_3$–$I_5$ proceed to the next pipeline stage, and instruction $I_6$ enters the R stage 204. In the third clock cycle, the combined current consumption is shown to be 45.

During a fourth clock cycle, instruction $I_3$ falls out of the pipeline, instructions $I_4$–$I_6$ proceed to the next pipeline stage, and instruction I7 enters the R stage 204. In the fourth clock cycle, the combined current consumption is shown to be 60.

During a fifth clock cycle, instruction $I_4$ falls out of the pipeline, instructions $I_5$–$I_7$ proceed to the next pipeline stage, and instruction $I_8$ enters the R stage 204. In the fifth clock cycle, the combined current consumption is shown to be 80.

The above is particularly illustrated by reference to chart 230 that graphically depicts the total current consumption of the processor 200 during clock cycles 1–5. It is information such as that shown within the chart 230 that is often used to break the security of a microprocessor 200, by determining what instructions are executing on it, on a clock-by-clock basis.

Figure 3:
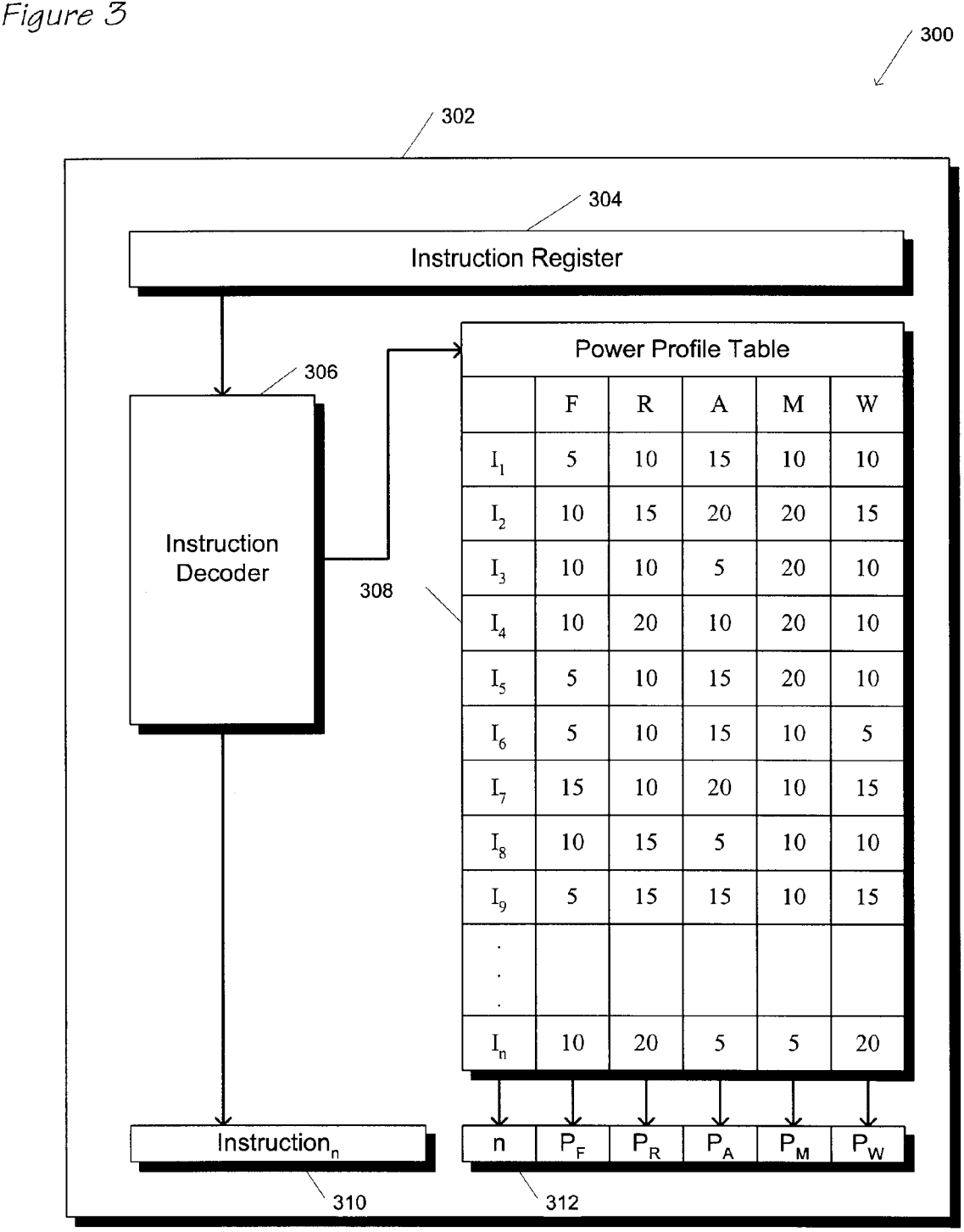
FIG. 3 is a block diagram of a predicted power profile table according to the present invention that predicts power consumption, per pipeline stage.

Referring now to FIG. 3, a diagram 300 is shown of a power profile table 308 within a decoder 302 of a modern microprocessor. More specifically, the decoder 302 includes an instruction register 304 for receiving and temporarily storing instructions from a fetcher. The instruction register 304 is attached to an instruction decoder 306. The decoder 306 decodes the instructions in the register 304, and provides them to an instruction buffer 310.

In addition, as the instruction decoder 306 decodes instructions, it provides a signal to the power profile table 308 indicating the instruction that is being decoded. That is, it indicates either the type of instruction (Load, ALU, JMP, etc.), or alternatively, the actual instruction within the instruction set of the microprocessor, which is being decoded. In one embodiment, the signal acts as an index into the power profile table 308 to select one of n different power profile entries in the table.

Each of the entries in the power profile table 308 contains an estimated power value, corresponding to a particular pipeline stage in the microprocessor. For example, the power profile entry associated with instruction $I_4$ indicates that this instruction a power value of 10 within the F stage, 20 within the R stage, 10 within the A stage, 20 within the M stage, and 10 within the W stage. As an entry in the power profile table 308 is indexed by the instruction decoder 306, the estimated power values are provided to a power profile register 312. In one embodiment, the power profile register 312 contains temporary storage for each of the power profile values for a particular instruction, along with an instruction indicator to designate which of the instructions the power profile entry 308 is associated with. One skilled in the art will appreciate that the values contained in a power profile entry may be determined heuristically by the manufacturer of a microprocessor prior to final fabrication. In addition, it should be appreciated that the power profile values will vary in different processor designs, and with different technologies used to manufacturer processors.

Figure 4:
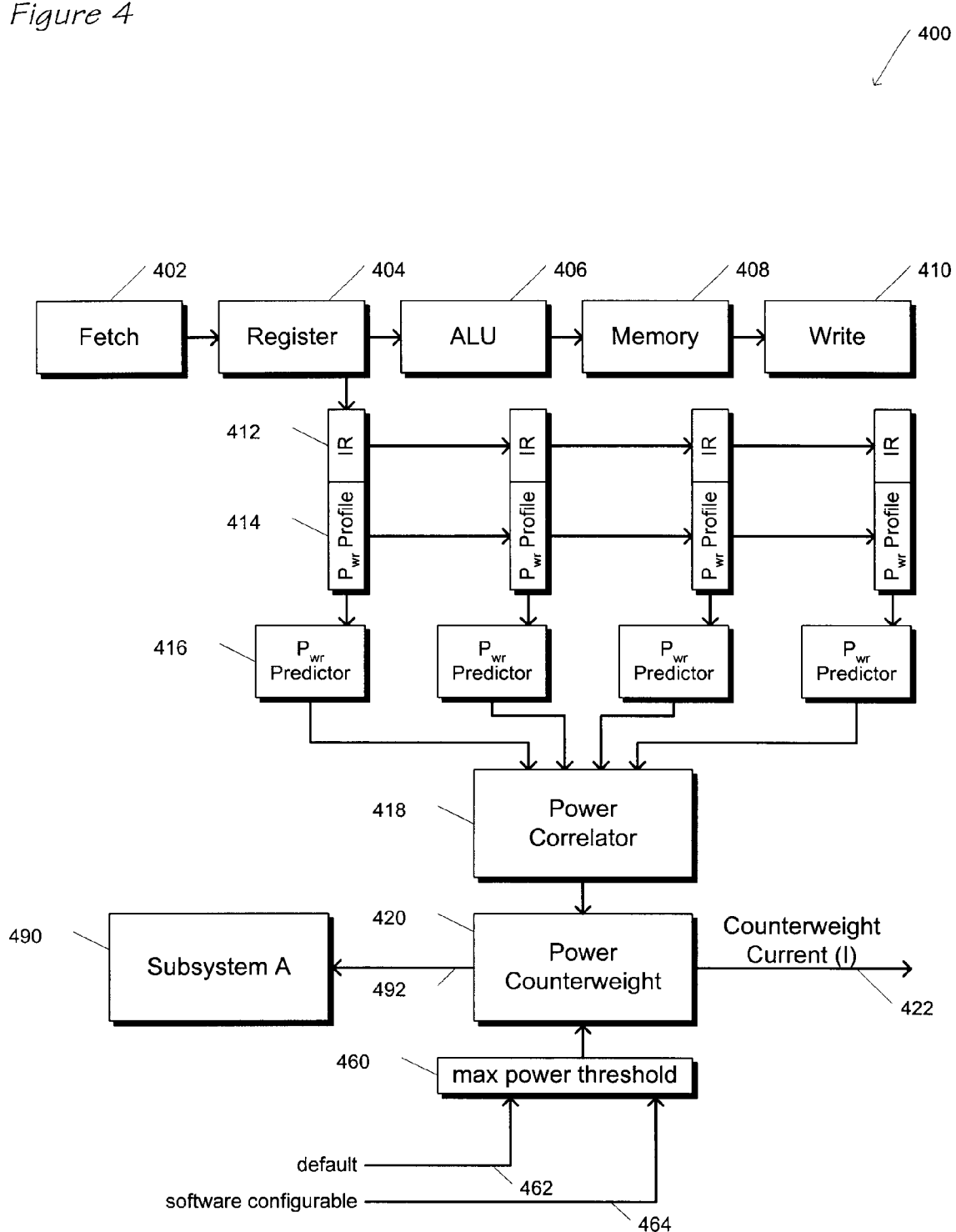
FIG. 4 is a block diagram of the predictive power correlation according to the present invention, within a pipeline microprocessor.

Referring now to FIG. 4, a block diagram 400 is shown illustrating a pipeline microprocessor, similar to that described above with reference to FIG. 2, including however, the novel power counterweight system of the present invention. The microprocessor 400 includes the five pipeline stages: Fetch 402, Register 404, ALU 406, Memory 408, and Write 410. In one embodiment, the power profile table 308 as shown in FIG. 3 is contained within the Register stage 404. As an instruction is decoded within the Register stage 404, it is provided to an instruction register 412. In addition, the decoder indexes into the power profile table 308, causing a power profile entry corresponding to the instruction to be stored into a power profile buffer 414. Then, as the instruction proceeds to each stage in the pipeline, the power profile entry associated with the instruction also proceeds down the pipeline, being stored in power profile buffers 414 located in each stage of the pipeline.

Coupled to each of the power profile buffers 414 are power predictors 416. The power predictors 416 extract the particular power profile value within the power profile buffer 414 that is appropriate for its pipeline stage. For example, the predictor 416 in the R stage will extract the R power profile value. The predictor 416 in the A stage will extract the A power profile value, etc.

Thus, for the microprocessor 400, at any one time, four distinct power profile values will be extracted by the power predictors 416, corresponding to four distinct instructions executing in the R, A, M and W stages of the pipeline. All of these power profile values are provided to a power correlator 418 for arithmetic combining. In one embodiment, the arithmetic combining is a simple summation of the values. In an alternate embodiment, the arithmetic combining allows predefined weighting to be applied to particular stages and/or allows minimum and maximum thresholds for each of the stages to be met, or substituted, for the values provided by the predictors 416. After the power correlator 418 performs the arithmetic combining, the combined power estimate is provided to a power counterweight 420.

The power counterweight 420 receives the combined power estimate from the power correlator 418 and produces a counterweight current 422, the purpose of which is to make the total power consumed by the processor to be invariant. That is, given a maximum power consumed by a processor, whenever the combined power estimate is less than the maximum power, the power counterweight 420 produces a counterweight current 422 that is equal to the maximum power minus the combined power estimate. This can be written as:

Counterweight Current=Max Power−Estimated Power

The maximum power threshold is provided via a maximum power threshold register 460 to the power counterweight 420. The contents of the power threshold register 460 may either be set from a pre-coded default 462, or alternatively, may be established at run-time through software configuration 464.

The power counterweight 420 is also coupled to a subsystem A 490 via an inhibit/burn signal line 492. Thus, as determined by the power counterweight 420, if additional power consumption may be met by turning on (burn) subsystem A 490 within the processor 400, the power counterweight indicates such to subsystem A 490 via the inhibit burn signal line 492. This can be either in place of a counterweight current 422, or in addition to a counterweight current 422. In addition, the power counterweight 420 may also choose to shut down the operation of subsystem A 490, if its functionality is not required during the next clock cycle, by providing an inhibit signal on the inhibit burn signal line 492, thereby reducing the power consumption of the processor 400. Such inhibition of subsystem A 490 can be accomplished either in addition to generation of the counterweight current 422, or as an alternative to the counterweight current 422 for the purpose of masking the power consumption of particular instructions that are executing (i.e., systems can be turned off to reduce current consumption in an amount proportional to a predicted value for a current clock cycle or randomly). One skilled in the art should appreciate that the discussion above related to subsystem A is exemplary only. In practice, the processor 400 will contain many subsystems (e.g., MMX, FPU, etc.) that may be turned on even when they are not needed, to increase the power consumption of the processor 400, or turned off, to reduce the power consumption of the processor 400, as determined by the power counterweight 420. In one embodiment, located within the power counterweight 420 is a table (not shown) containing the on/off power requirements for each of the subsystems within the processor 400. Inhibit/burn signal lines 492 are connected to each of the subsystems so that they may be turned on or off as determined by the power counterweight 420.

Figure 5:
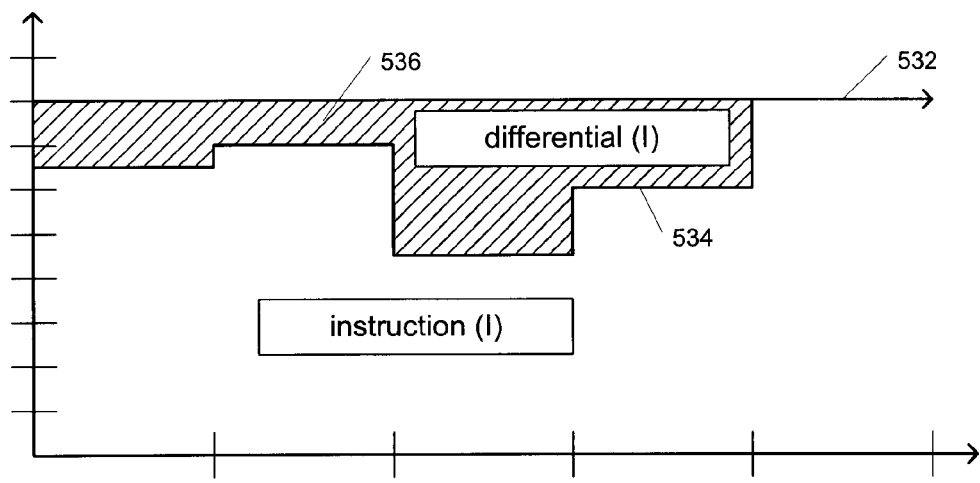
FIG. 5 is a diagram illustrating the power consumption of a pipeline microprocessor incorporating the power prediction and counterweight according to the present invention.

To illustrate the effect the power predictor 418 and power counterweight 420 have on the total power consumed within the processor 400, attention is now directed at FIG. 5. FIG. 5 contains a table 520, similar to that shown in FIG. 2, along with a power graph 530 illustrating power consumed by a processor that is executing the instructions in table 520.

More specifically, during clock cycle 1, instructions $I_1$ thru $I_4$ are found within pipeline stages W–R, respectively. Thus, instructions $I_1$ thru $I_4$ have a combined power consumption of 65. This is shown as current (I) line 534. The power predictor 416 of FIG. 4 provides the power estimate values for each of these instructions to the power correlator 418, which in turn, provides an arithmetic sum of these values to the power counterweight 420. The power counterweight 420 then produces a counterweight current 422 of 15 so that a maximum power threshold of 80 is consumed by the processor 400.

During clock cycle 2, the power predictors 416 provide the power estimate values for instructions $I_2$ thru $I_5$ to the power correlator 418 to produce a combined power value of 70. This value is provided to the power counterweight 420. The power counterweight 420 therefore provides a counterweight current 422 with a value of 10 so that a maximum power threshold of 80 is consumed by the processor 400. Thus, during clock cycle 2, although the instructions that are executing are different than those executing in clock cycle 1, the total power consumed by the processor 400 is the same.

During clock cycle 3, the combined power estimate for instructions $I_3$ thru $I_6$ is 45. This value is provided to the power counterweight 420, to produce a counterweight current 422 of 35. Thus, the maximum power threshold that is consumed by the processor during clock cycle 3 is 80.

During clock cycle 4, the combined power estimate for instructions $I_4$ thru $I_7$ is 60. This value is provided to the power counterweight 420, to produce a counterweight current 422 of 20. Thus, the maximum power threshold that is consumed by the processor during clock cycle 4 is 80.

During clock cycle 5, the combined power estimate for instructions $I_5$ thru $I_8$ is 80. This value is provided to the power counterweight 420, to produce a counterweight current 422 of 0. Thus, the maximum power threshold that is consumed by the processor during clock cycle 5 is 80.

So, in graph 530, although we have different instructions proceeding thru the five pipeline stages during clock cycles 1–5, with different combined power consumption values (shown by line 534), the total power consumed remains at 80 (shown by line 532). This is because the power counterweight 420 produces a differential counterweight current 422, illustrated by shaded area 536.

Figure 6:
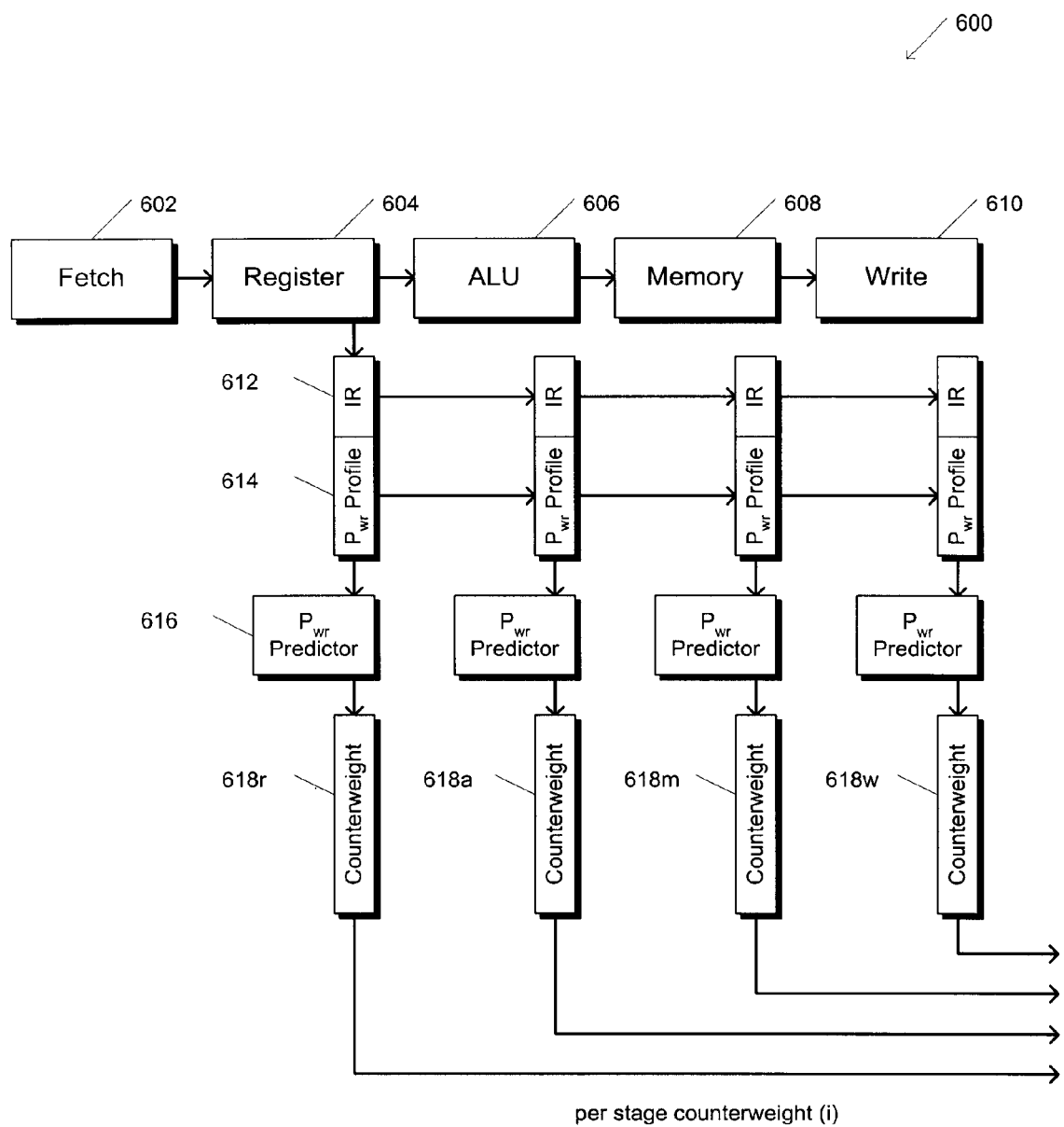
FIG. 6 is block diagram illustrating per stage power prediction logic within a pipeline processor according to the present invention.

Referring now to FIG. 6, a block diagram is provided of a microprocessor 600, similar to that described above with reference to FIG. 4. However, in this embodiment, rather than providing a power correlator 418 to arithmetically combine power profile values for each of the pipeline stages, a power counterweight 618 is added to each of the stages (r, a, m, and w) to produce distinct counterweight currents for each stage. Thus, the power estimate value is provided from the power predictor 616 in each stage directly to a stage specific power counterweight 618. The resulting maximum power consumed by the processor is identical to that shown in FIG. 5, but without having to arithmetically combine the individual power estimate values.

Figure 7:
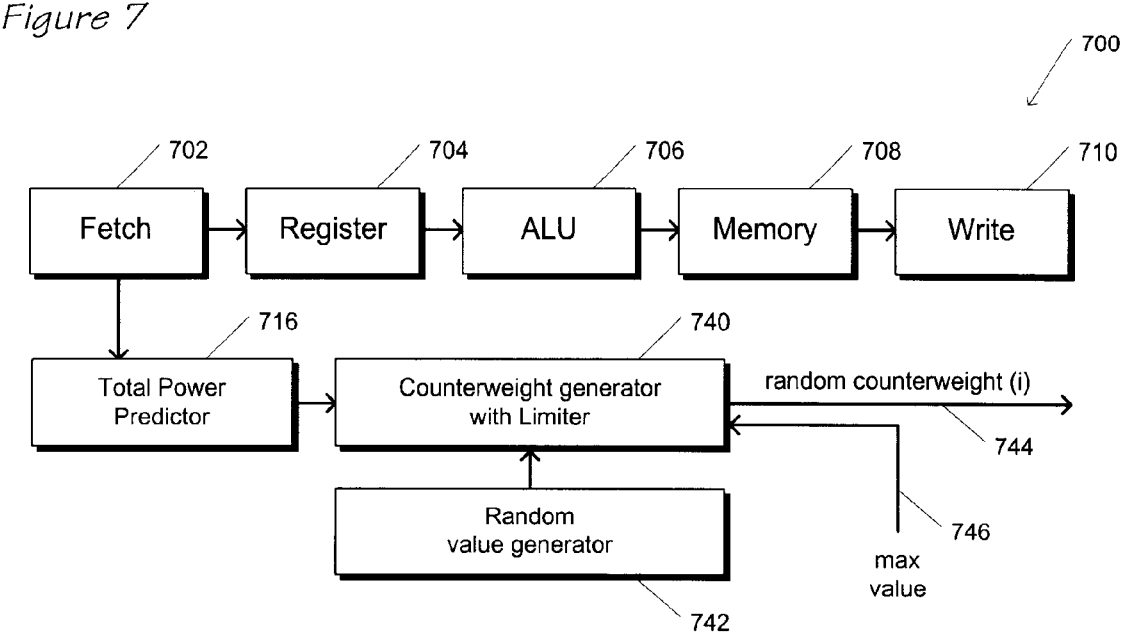
FIG. 7 is a block diagram of a random power counterweight circuit within a pipeline microprocessor according to the present invention.

Referring to FIG. 7, and alternative embodiment of the present invention is shown within a microprocessor 700. One purpose of the invention described above has been to disassociate the power consumed by a microprocessor from the instructions it is executing. The embodiments shown in FIGS. 4 and 6 disassociate the power by adding a counterweight current to obtain a maximum threshold value, thereby making the current drain invariant. In contrast, the embodiment of FIG. 7 disassociates the power consumed by the microprocessor with instructions it is executing by adding a random counterweight current.

The processor 700 includes a fetch stage 702, a register stage 704, an ALU stage 706, a memory stage 708, and a write stage 710. Coupled to the fetch stage 702 (or alternatively the register stage 704) is a total power predictor 716. The total power predictor 716 is used to predict the total power that will be consumed during each clock cycle by instructions in the pipeline stages 704–710, similar to the power predictor 416 of FIG. 4. Although the predictor 716 is not necessary to the embodiment shown in FIG. 7, its prediction can be used to limit the random counterweight current 744 as will be further described below. Coupled to the total power predictor 716 is a counterweight generator 740 for producing a random counterweight 744. The counterweight generator 740 is also connected to a random number generator 742.

Operationally, for each clock cycle of the microprocessor 700, the random number generator 742 provides a random value to the counterweight generator 740. The counterweight generator 740 then generates a random counterweight current 744 that is proportional to the random value provided by the random number generator 742. By adding the random counterweight current 744 to the power already consumed by the executing instructions, the total power consumed by the microprocessor 700 will be disassociated with the instructions it is executing, as will particularly illustrated below with reference to FIG. 8. This has been accomplished without any estimation of the power that will be consumed, and without any coupling of the counterweight generator to the instructions that are executing. However, without the use of the total power predictor 716, it is possible that the power consumed by the microprocessor 700, during a particular clock cycle, may exceed an overall maximum threshold. So, the total power predictor 716 provides an estimate of the total power that will be consumed by the microprocessor 700 to the counterweight generator 740. Within the counterweight generator 740 is a limiter that throttles the random counterweight current 744 to a predefined threshold. That is, whenever the random counterweight current 744, plus the total estimated power that is predicted by the total power predictor 716, exceeds a predefined threshold, the amount of the random counterweight current 744 is limited so that the total power consumed by the microprocessor 700 does not exceed the predefined threshold. One skilled in the art will appreciate that the predefined threshold may be set similar to that described above with reference to FIG. 4, either at time of fabrication, or via software configuration.

Figure 8:
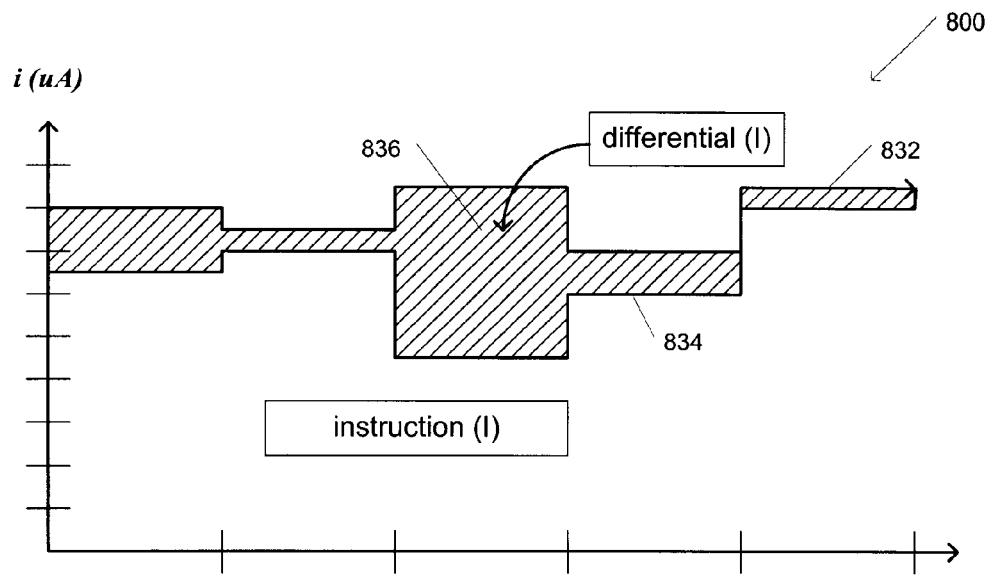
FIG. 8 is a graph illustrating the random power counterweigh circuit of FIG. 7.

Referring now to FIG. 8, a graph 800 is shown illustrating the power consumption of the microprocessor 700 utilizing the counterweight generator 740. For ease of illustration, the instructions executing during clock cycles 1–5 are the same as those illustrated in table 520 of FIG. 5.

During the first clock cycle, instructions I1 thru I4 have a power consumption of 65. In addition, the random number generator 742 provides a random value to the counterweight generator 740 to produce a random counterweight current 744 of 15. So, the total power consumed by the microprocessor is 80.

During the second clock cycle, instructions $I_2$ thru $I_5$ have a power consumption of 70 (5 more than in clock cycle 1). In addition, the random number generator 742 provides a random value to the counterweight generator 740 to produce a random counterweight current 744 of 5. So, the total power consumed by the microprocessor is 75. So, during clock cycle 2, even though the total power consumed by instructions $I_2$ thru $I_5$ is greater than the instructions executing during clock cycle 1, the total power consumed by the microprocessor 700 is 5 less than during clock cycle 1.

During the third clock cycle, instructions $I_3$ thru $I_6$ have a power consumption of 45. In addition, the random number generator 742 provides a random value to the counterweight generator 740 to produce a random counterweight current 744 of 40. So, the total power consumed by the microprocessor is 85. So, during clock cycle 3, even though the total power consumed by instructions $I_3$ thru $I_6$ is less than the instructions executing during clock cycles 1 or 2, the total power consumed by the microprocessor 700 is greater than during those clock cycles.

During the fourth clock cycle, instructions $I_4$ thru $I_7$ have a power consumption of 60. In addition, the random number generator 742 provides a random value to the counterweight generator 740 to produce a random counterweight current 744 of 10. So, the total power consumed by the microprocessor is 70.

During the fifth clock cycle, instructions $I_5$ thru $I_8$ have a power consumption of 80. In addition, the random number generator 742 provides a random value to the counterweight generator 740 to produce a random counterweight current 744 of 15. However, in this instance, the counterweight current 744, plus the estimated power consumption of 80, exceeds a maximum power threshold of 85. So, the counterweight generator with limiter 740 limits the random counterweight current 744 to a value of 5, resulting in a total power consumption of 85.

What has been illustrated with respect to FIGS. 3–6 are embodiments of the invention that disassociate power consumption of a processing device with the instructions it is executing by estimating the power that will be consumed during each clock cycle, and producing a counterweight current that makes the total power consumption invariant, regardless of what instructions are in the pipeline. With respect to FIGS. 7–8, an embodiment of the invention is described that disassociates the power consumption of a processing device with the instructions it is executing, by adding a randomized counterweight current to the total power consumed. Thus, whether the total power consumed is made invariant, or is randomized, there is no correlation between the total power consumed and the instructions that are being executed, that may be used by scientist to speculate or determine the instruction flow of a processing device incorporating the present invention.

Although the present invention and its objects, features, and advantages have been described in detail, other embodiments are encompassed by the invention as well. In addition to implementations of the invention using hardware, the invention can be embodied in a computer usable (e.g., readable) medium configured to store a computer readable program code. The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished by the invention as described above can be represented in a core that is embodied in programming code and may be transformed to hardware as part of the production of integrated circuits. Also, the invention may be embodied as a combination of hardware and software.

In addition, the present invention has been particularly characterized in terms of a CPU or microprocessor. In particular, the embodiments of the present invention described with reference to FIGS. 3–8 portray its application within a 5-stage pipelined CPU 400. These specific embodiments and characterizations are presented herein as representative embodiments for the present invention. However, such description should by no means restrict application of the concept to a pipeline microprocessor, much less a 5-stage processor. Rather, the embodiments described that make the total power consumption of a processing device invariant, or random, may be applied to any processing device capable of executing instructions.

Furthermore, the discussion above has not attempted to describe the operation of the invention within the nuances of modern processor instruction flow. That is, one skilled in the art will appreciate that instruction flow within a pipeline microprocessor is often non-sequential, with flow being interrupted by branches, error conditions, etc. In addition, it is common for instruction flow to stall or slip for a number of cycles, either when waiting on following pipeline stages to complete an operation, or when retrieving/storing data from/to memory. Such discussion has been removed so that the reader will more readily understand the invention. However, while not shown, it should be understood that the counterweight current of the present invention, particularly, the power counterweight block 420, is coupled to the interlock control of a processing device, and the power predictor 416 is coupled not only to the decoder, but also to the instruction pointer (and next instruction pointer) so that they may properly estimate and control the counterweight current in relation to the actual instruction flow of a modern processing device.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus within a processing device for disassociating the power consumed by the processing device with the instructions it is executing, the apparatus comprising:

a power predictor, for providing a power consumption value for an executing instruction; and a power counterweight, coupled to said power predictor, for receiving said power consumption value, and for generating a counterweight current;

wherein said counterweight current causes a total power consumption of the processing device to be disassociated with said executing instruction.

2. The apparatus as recited in claim 1 wherein the processing device is a pipelined microprocessor.

3. The apparatus as recited in claim 1 wherein said power predictor comprises:

a power profile table having a plurality of power consumption entries, said entries corresponding to types of instructions that may be executed by the processing device.

4. The apparatus as recited in claim 3 wherein each of said power consumption entries comprises a plurality of power consumption values, said values corresponding to a predicted power consumption of an instruction within particular processing stages of the processing device.

5. The apparatus as recited in claim 3 wherein said power predictor further comprises a power entry selector, for selecting one of said plurality of power consumption entries to be output to said power counterweight.

6. The apparatus as recited in claim 5 wherein said power entry selector selects said one of said plurality of power consumption entries corresponding to which of said types of instructions the processing device is executing.

7. The apparatus as recited in claim 1 wherein said power counterweight produces said counterweight current to cause the total power consumption of the processing device to remain the same, regardless of which of the instructions the processing device is executing.

8. The apparatus as recited in claim 7 wherein said power counterweight is provided a maximum power threshold for the processing device, and configures said counterweight current such that said maximum power threshold equals said received power consumption value plus said counterweight current.

9. The apparatus as recited in claim 7 wherein said maximum power threshold is a default established during manufacture of the processing device.

10. The apparatus as recited in claim 7 wherein said maximum power threshold is configurable by software executing on the processing device.

11. The apparatus as recited in claim 1 wherein said power predictor comprises:

a plurality of staged power predictors, each for extracting a staged power prediction for an associated instruction; and a power correlator, coupled to said plurality of staged power predictors, for receiving a plurality of said staged power predictions from said plurality of staged power predictors, and for generating said power consumption value.

12. The apparatus as recited in claim 11 wherein said power correlator sums each of said received plurality of staged power predictions for generating said power consumption value.

13. The apparatus as recited in claim 11 wherein said power correlator arithmetically computes said power consumption value utilizing said received plurality of staged power predictions.

14. A power security system for a microprocessor for insuring that the power consumption of the microprocessor is not indicative of the instructions that it is executing, the system comprising:

a power predictor, for estimating power that will be consumed by the microprocessor when executing particular instructions; and a power counterweight circuit, coupled to said power predictor, for utilizing said estimated power, and for applying counterweight power within the microprocessor during execution of the instructions;

wherein said counterweight power applied by said power counterweight circuit varies according to said estimated power.

15. The power security system as recited in claim 14 wherein the security system is prevents the use of differential power analysis to determine what instructions are executing on the microprocessor.

16. The power security system as recited in claim 14 wherein the microprocessor is an embedded pipelined microprocessor.

17. The power security system as recited in claim 14 wherein the microprocessor is embedded within a Smart card.

18. The power security system as recited in claim 14 wherein said power predictor examines each instruction to be executed to estimate the power said each instruction will consume.

19. The power security system as recited in claim 18 wherein said power predictor estimates the power said each instruction will consume in each of a plurality of stages within a pipeline of the microprocessor.

20. The power security system as recited in claim 14 wherein said power predictor generates a power estimate signal for said power counterweight circuit.

21. The power security system as recited in claim 14 wherein said power predictor comprises:

a power profile table having a plurality of power profile entries corresponding to a plurality of different instructions, said entries having a plurality of power estimates corresponding to power consumed in a plurality of different pipeline stages within the microprocessor.

22. The power security system as recited in claim 21 wherein said power predictor further comprises:

a power profile register, coupled to said power profile table, for temporarily storing one of said power profile entries corresponding to one of said plurality of different instructions.

23. The power security system as recited in claim 22 wherein said power profile register provides said one of said power profile entries to said power counterweight circuit.

24. The power security system as recited in claim 21 wherein said power predictor further comprises:

a power correlator, for utilizing a plurality of said power profile entries for arithmetically computing an estimated total power consumption value for each clock cycle within the microprocessor.

25. The power security system as recited in claim 14 wherein said counterweight power plus said estimated power is less than or equal to a maximum power threshold.

26. An apparatus within a processing device for randomizing the total power consumed within the processing device, comprising:

a random value generator, for generating a random value as instructions are executed by the processing device; and a counterweight generator, coupled to said random value generator, for generating a random power counterweight corresponding to said generated random value;

wherein said random power counterweight disassociates said instructions that are executed from power consumed by the processing device during their execution.

27. The apparatus as recited in claim 26 wherein said random value generator generates said random value between zero and a predetermined maximum value.

28. The apparatus as recited in claim 27 wherein said counterweight generator generates said random power counterweight between zero and a maximum value corresponding to said predetermined maximum value.

29. The apparatus as recited in claim 26 further comprising:

a total power predictor, coupled to said counterweight generator, for providing an estimated total power value to said counterweight generator.

30. The apparatus as recited in claim 29 wherein said counterweight generator utilizes said estimated total power value to limit said random power counterweight so that the total power consumed by the processing device does not exceed a predetermined threshold.

31. The apparatus as recited in claim 26 wherein said counterweight generator generates said random power counterweight on each clock cycle of processing device.

32. The apparatus as recited in claim 26 wherein said random value generator generates a distinct random value one each clock cycle of the processing device.

33. A computer program product for use with a computing device, the computer program product comprising:

a computer usable medium, having computer readable program code embodied in said medium, for causing a CPU to be described, said computer readable program code comprising:

first program code for providing a power predictor that predicts the power that will be consumed as an instruction executes on the CPU; and second program code for providing a power counterweight to generate a counterweight current as the instruction executes on the CPU, said counterweight current disassociating the total power consumed by the CPU from the executing instruction.

34. The computer program product, as recited in claim 33 wherein said power counterweight causes the CPU to consume an equivalent power regardless of the instruction that is being executed.

35. The computer program product, as recited in claim 33 wherein said power counterweight causes the CPU to consume a random power regardless of the instruction that is being executed.

36. A method for disassociating, on a clock by clock basis, the power that is consumed by a pipelined microprocessor, from the instructions that it is executing, the method comprising:

estimating the power that will be consumed by each instruction in the pipeline for each clock cycle; and adding a counterweight current on each clock cycle such that the total power consumed by the microprocessor is invariant.

37. The method as recited in claim 36 wherein the counterweight current increases as the estimated power decreases, and vice-versa.

38. A computer data signal embodied in a transmission medium comprising:

computer-readable first program code for providing a power predictor that predicts the power that will be consumed as an instruction executes on a CPU; and computer-readable second program code for providing a power counterweight to generate a counterweight current as the instruction executes on the CPU, said counterweight current disassociating the total power consumed by the CPU from the executing instruction.

39. The computer data signal of claim 38 wherein said power counterweight causes the CPU to consume an equivalent power regardless of the instruction that is being executed.

40. The computer data signal of claim 38 wherein said power counterweight causes the CPU to consume a random power regardless of the instruction that is being executed.

* * * * *